June 16, 1959 — R. G. EVANS — 2,890,693
WORKPIECE CONVEYOR CART FOR MASONRY SAWS
Filed Jan. 28, 1959
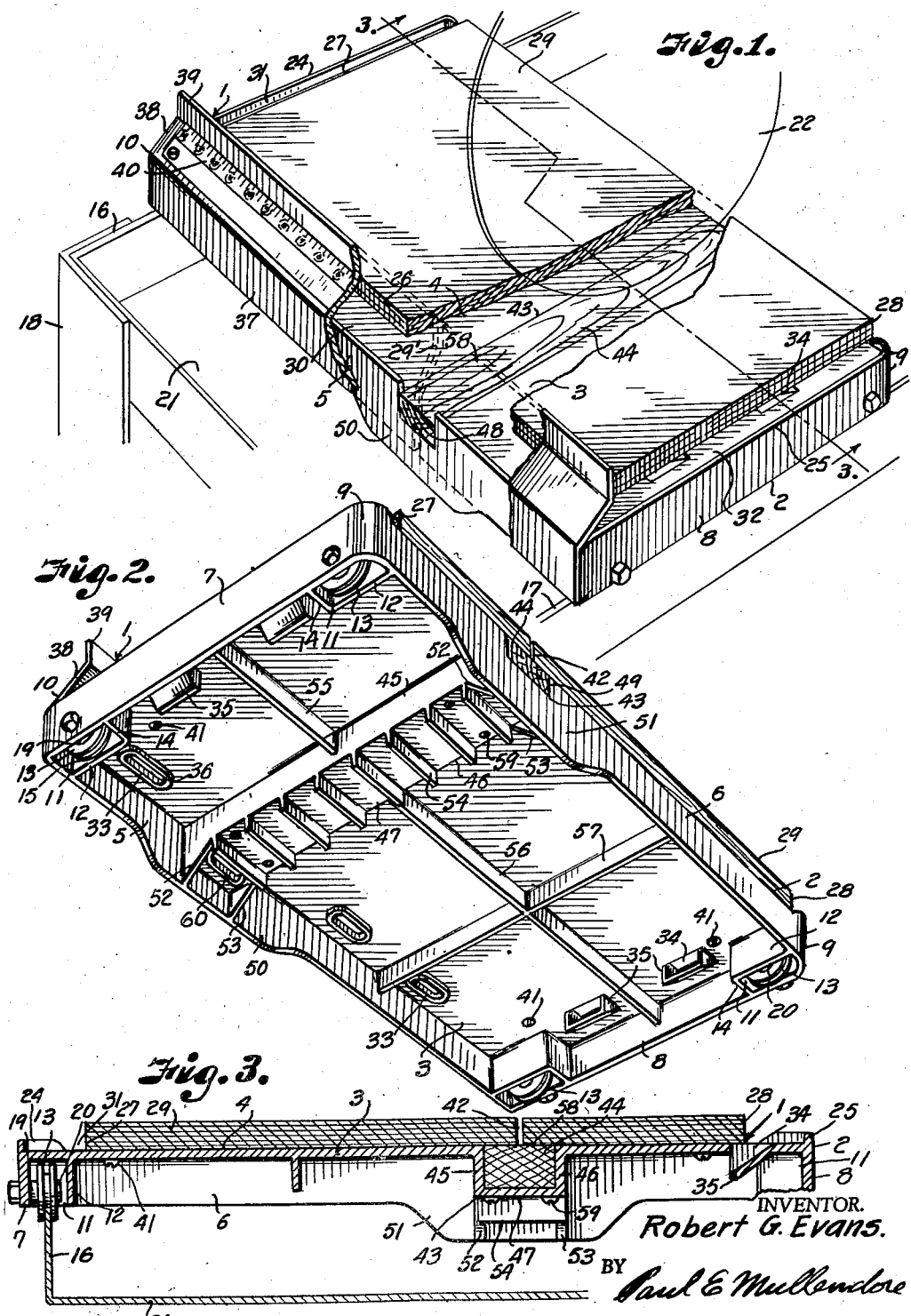
INVENTOR.
Robert G. Evans.
BY
Paul E. Mullendore
ATTORNEY.

2,890,693

WORKPIECE CONVEYOR CART FOR MASONRY SAWS

Robert G. Evans, Prairie Village, Kans., assignor to Robert G. Evans Company, Kansas City, Mo., a partnership Application January 28, 1959, Serial No. 789,690

8 Claims. (Cl. 125—35)

This invention relates to masonry saws, and more particularly to a work conveyor cart therefor.

Masonry saws usually include a frame having a substantially horizontal portion provided with spaced apart tracks for carrying a reciprocable cart on which the work is moved into the blade of the saw while the saw is brought into contact with the work under control of the operator. Usually the blade of such a saw is brought into contact with the work by foot pressure against action of a spring which lifts the blade from the work upon release of the foot pressure after completion of a cut, as disclosed in the Tucker Patent 2,726,651. When cutting some types of materials, it is difficult for the operator to release the pressure the instant that the blade cuts through the work, with the result that the pressure jumps the blade into cutting contact with the cart. This damages the blade and the cut into the cart weakens the cart, so that it is impossible to produce satisfactory cuts without replacing the blade and/or repairing the cart. Blade replacements are expensive, especially when they are constructed of the faster cutting abrasives such as diamonds and diamond particles.

It is, therefore, a principal object of the present invention to provide a strong, rigid cart structure that holds the work firmly in contact with the blade and which is constructed to prevent damage to the blade after completion of a cut.

Other objects of the invention are to provide a cart with a removable cushion element for the blade, to eliminate direct contact of the blade with the metal parts of the cart, and to provide a cushioning element which is resistant to the cutting action of the blade thereon; and to provide the cart with a fore and aft recess of sufficient depth, which, with the shock absorption of the cushioning element, permits the operator time to release the foot pressure before the blade can cut into the metal of the cart; to provide a cushioning element that substantially fills the recess to the exclusion of water and sludge; and to accommodate a cushioning element having a thickness to prolong the time when replacement of the cushioning element becomes necessary.

Other objects of the invention are to provide a cart having a construction which facilitates draining of the water and sludge into the collecting pan over which the cart is reciprocated; and to provide for draining of the fore and aft recess of any water that may tend to seep around the cushioning element.

It is also an object of the invention to provide ample reinforcement under the recess to prevent sagging of the cart under load of the work and pressure of the blade.

In accomplishing these and other objects of the invention, as hereinafter described, I have provided improved structure, the preferred form of which is illustrated in the accompanying drawing, wherein:

Fig. 1 is a perspective view of a cart constructed in accordance with the present invention, with the cart being shown in full lines and with the blade and cart supporting parts of the masonry saw frame being illustrated in lighter lines.

Fig. 2 is a perspective view of the under side of the cart.

Fig. 3 is a transverse section through the cart on the line 3—3 of Fig. 1.

Referring more in detail to the drawings:

1 designates a work supporting cart constructed in accordance with the present invention, and particularly adapted to masonry saws of the type disclosed in the above mentioned Tucker patent. The cart includes a unitary body 2 which is preferably formed of strong light weight metal alloy casing to provide a cart of ample strength and rigidity. The body 2 of the cart is of generally rectangular contour and has a platen or top portion 3 providing a planular upper surface 4. Depending from the platen portion are front and back flanges 5 and 6 and depending side flanges 7 and 8. The flanges are integral with the platen 3 and are integrally connected at the ends thereof to provide a continuous annular frame portion to resist compression loads on the cart. The back flange 6 preferably joins with the side flanges 7 and 8 on rounding curves 9, but the front flange 5 joins with the side flanges 7 and 8 at substantially right angles to provide support for the ends of a work backing bar or gauge 10, as later described.

Formed in the corners of the body 2 at the juncture of the transverse flanges 5 and 6 with the side flanges 7 and 8 are wheel pockets 11, each of which includes integrally a longitudinal wall portion 12 extending in inwardly spaced parallel relation with the adjacent side walls 7 and 8. The wall portions 12 are of ample length to accommodate the diameter of the wheels 13 and the inner ends each connect with the adjacent side flanges by wall portions 14. The wheels 13 have grooved peripheries 15 which roll on tracks 16 and 17 at opposite sides of the frame 18 of the masonry saw. The wheels 13 have hub portions 19 rotatably mounted on stub axles 20 that are fixed to the side flanges of the cart. It is obvious that the wall portions which form the inner sides of the wheel sockets enhance the rigidity of the corners of the cart, so that the depending flanges provide ample and solid support for the wheels 13. The body of the cart has a transverse width to mount the wheels on the tracks and span a water and sludge collecting pan 21, and over which the cart is reciprocated to carry a workpiece thereon into the blade 22 of the saw, as later to be described. The body of the cart also has upstanding rim portions 23 extending along the transverse front of the cart and corresponding upwardly extending side flanges 24 and 25 at the sides of the cart to cooperate with corresponding edge faces 26, 27 and 28 of a working top 29 to provide gutters 30, 31 and 32 into which the water and sludge drains for passage through ports 33 spaced along the length of the gutter 30 and side ports 34 located along the side gutters 31 and 32. The side ports 34 open through the platen portion 3 of the cart and the water and sludge is directed inwardly by spouts 35 which are also integral with the body of the cart. The spouts are arranged to direct the water and sludge away from the tracks 16 and 17 and to assure discharge into the collecting pan 21. The discharge ports 33 in the gutter 30 may open directly through the platen portion of the cart, but the other marginal edges on the underside of the platen may be surrounded by a depending rib or lip 36.

The gauge 10 may be formed of substantially rigid sheet metal to provide a flange portion 37 adapted to overlap the front face of the depending flange 5 at the front of the cart and which is suitably secured thereto. The gauge also includes a rearwardly and upwardly inclined web portion 38 terminating in a transverse rail 39 that projects above the top 39 and provides an abutment for the workpiece to be cut. Mounted on the web portion of the gauge is a scale 40, preferably indexed in inches, to locate the point at which the workpiece, such as a block, stone, tile, or the like, is to be cut. The gauge has a gap 29' therein in registry with the blade to permit the blade to pass therethrough when a cut is made.

The working top 29 is preferably plywood, as plywood is wear resistant and is readily replaced when worn. The top 29 is secured to the metal platen portion of the cart by fastening devices such as screws 41 that extend through the platen portion and into the top 29.

At the point of the blade 22, the top is provided with a fore and aft groove or cut 42, which may be produced by the blade or which may be initially formed, to provide a normal clearance between the saw blade and the body of the cart upon completion of a cut. However, under some conditions, particularly when the blade operates upon certain types of materials, the operator may not release the foot pressure on the blade the instant that the blade cuts through the work. Consequently, thickness of the plywood top may be insufficient, so that the blade would jump into cutting contact with the cart before the foot pressure can be released and the spring becomes effective in raising the blade. It is obvious that the blade would cut into the metal of the cart, and that the result thereof would be to weaken the cart so that it may sag under load and interfere with proper action of the cutting blade when cutting subsequent workpieces. Also, contact of the blade with the metal of the cart would in most cases result in damage to the blade. To avoid these difficulties, the cart of the present invention is provided with a recess 43 that extends in a fore and aft direction and in registry with the blade. The ends of the recess continue through the flanges at the front and rear of the cart to permit full reciprocatory movement of the cart under the blade.

The recess 43 contains a blade cushioning element 44 that extends the full length thereof. The recess 43 is provided in the platen of the portion of the cart between spaced apart integral walls 45 and 46 depending from the lower face of the platen and connected by an integral web or bottom 47. The ends of the walls 45 and 46 and bottom 47 join integrally with the depending transverse front and rear flanges, as best shown in Fig. 2. Since the ends of the recess open through the depending front and rear flanges, as indicated at 48 and 49, the depending front and rear flanges are provided with depending extensions 50 and 51 to compensate for the absence of the material at the ends of the recess. The depending extensions are preferably reinforced with respect to the side walls 45—46 and web 47 by integral gussets 52 and 53, shown in Fig. 2. The web 47 is also reinforced at spaced points along the length thereof by depending ribs 54 which extend transversely thereof. The bottom of the platen portion and walls 45 and 46 of the recess, as well as the side flanges 7 and 8, are reinforced with transverse ribs 55 and 56 that interconnect therewith. It is obvious that the walls and web portion which provide the fore and aft recess act materially in reinforcing the platen portion of the cart. To further strengthen and enhance the rigidity of the platen portion of the cart, the rib 56 is connected with the front and rear depending flanges by a rib 57 located intermediate the side flange 8 and the flange 46, also best shown in Fig. 2.

The cushioning element 44 is of a size and shape to fill the recess 43 and has an upper face 58 thereof registering with the upper surface of the platen portion, whereby the top board extends firmly thereacross. The cushioning element may be of wood or plastic or a suitable composition capable of absorbing shock on the cutting blade in case the cutting blade should jump through the depth of the top board. If the cushioning element is made of wood, a kind of wood is selected with a compact grain which extends longitudinally thereof. Therefore, the blade makes contact therewith in the longitudinal direction of the grain, to avoid or reduce as much as possible cutting of the blade into the wood and yet provide the desired shock absorbing action. The wood cushioning element is secured in the recess by fasteners such as screws 59 that extend through the web 47.

In using the cart constructed and assembled as described, it is placed upon the tracks or rails 16 and 17, with the grooved portions of the wheels 13 riding on the tracks and the flanges engaging the sides thereof for guiding the cart into reciprocatory movement and to eliminate side play relatively to the cutting blade of the saw. The workpiece, such as a tile or the like (not shown), is placed on the top board 29 of the cart and positioned thereon with the aid of the scale 39, to assure that the tile is cut to a desired length, the workpiece having been so placed on the cart that it is in contact with the rail 38 of the gauge. The cutting blade is brought into contact with the tile by the operator applying pressure to the foot pedal in opposition to the spring, as disclosed in the above mentioned patent. The cart is then reciprocated on the tracks to move the workpiece into contact with the blade to make the desired cut.

Ordinarily, the operator has sufficient skill and experience to release the pressure on the cutting blade at the instant the blade cuts through the tile and the top board provides ample clearance in most instances to prevent the blade from jumping into contact with the cushioning element. However, should the blade jump suddenly through the cut in the top, the shock thereof is cushioned by contact with the cushioning element and the blade is released before the blade can cut deeply into the cushioning element.

During the cutting operation, water is used on the blade, which water and the sludge formed by the cuttings flow over the surface of the top board and down the front and side edges thereof into the gutters, from which the water and sludge flow into the collecting pan 21, the flow of the water from the side gutters being directed toward the center by means of the spouts 35 and away from the tracks 16 and 17. Water may tend to seep past the cushioning element and into the fore and aft recess, but this water is readily drained through a discharge opening 60 in the web 47.

From the foregoing, it is obvious that I have provided a cart of strong, rigid construction, to firmly hold a workpiece in contact with the blade of a masonry saw, and that in case of jump-through of the blade under foot pressure of the operator, the blade is amply cushioned by the cushioning element to prevent damage to the blade. This is particularly important when the blade is constructed of the more rapid cutting materials, such as diamonds and diamond particles and other expensive abrasive materials.

What I claim and desire to secure by Letters Patent is:

1. A workpiece conveyor cart for masonry saws of a type including a frame having spaced tracks at the sides of the frame for reciprocably supporting the cart thereon for carrying a workpiece into and out of contact with a saw blade which is adapted to be raised and lowered over the cart to make a cut through the workpiece, said cart including a body member, wheels journaled at the sides of the body member and adapted to roll on the tracks, said body member having a recess registering with the blade and extending longitudinally of the body member, and a cushioning element filling the recess for cushioning the blade when the blade cuts through the workpiece.

2. A workpiece conveyor cart for masonry saws as described in claim 1, wherein the cushioning element comprises a wood strip and means for retaining the strip in the recess.

3. A workpiece conveyor cart for masonry saws as described in claim 1, wherein the cushioning element comprises a wood strip with the grain of the wood extending longitudinally of the recess.

4. A workpiece conveyor cart for masonry saws of a type including a frame having spaced tracks at the sides of the frame for reciprocably supporting the cart thereon for carrying a workpiece into and out of contact with a saw blade which is adapted to be raised and lowered over the cart to make a cut through the workpiece, said cart including a body member, wheels journaled at the sides of the body member and adapted to roll on the tracks, a top member covering the body member for supporting the workpiece thereon and having a cut therethrough to accommodate the blade when the blade cuts through the workpiece, said body member having a recess registering with the cut in said top member and extending longitudinally of the body member, and a cushioning element under the top member and filling the recess for cushioning the blade when the blade cuts through the workpiece.

5. A workpiece conveyor cart for masonry saws of a type including a frame having spaced tracks at the sides of the frame for reciprocably supporting the cart thereon for carrying a workpiece into and out of contact with a saw blade which is adapted to be raised and lowered over the cart to make a cut through the workpiece, said cart including a body member, wheels journaled at the sides of the body member and adapted to roll on the tracks, a plywood board covering the body member for supporting the workpiece thereon and having a cut therethrough to accommodate the blade when the blade cuts through the workpiece, said body member having a recess registering with the cut in said board and extending longitudinally of the body member, and a wood strip under the top member and filling the recess with the grain of the wood extending longitudinally of the cut made by the blade for cushioning the blade when the blade cuts through the workpiece.

6. A workpiece conveying cart for masonry saws of a type including a frame having spaced tracks at sides of the frame for reciprocably supporting the cart under a rotary blade which is adapted to be lowered into contact under pressure with a workpiece adapted to be carried by the cart and raised from the workpiece by action of a spring, said cart including a body member having a substantially rectangular platen portion and flanges depending from the front, back and sides of the platen portion, wheels journaled on the side flanges and adapted to roll on the tracks, said platen portion having portions thereof spaced apart at a point in registry with the blade of the saw to provide a recess, wall portions depending from said spaced portions of the platen and providing closed sides for the recess and connected along lower edges by a web closing the bottom of said recess, said ends of the recess extending through the front and rear depending flanges, a cushioning element in the recess and having side portions engaging the side walls of the recess and an under face engaging the web for supporting the upper face in registry with the upper face of the platen for cushioning the blade when the blade cuts through a workpiece, and a gauge extending across the depending front flange of the cart and having an upwardly projecting portion for abutting the workpiece to hold the workpiece into the blade when the cart is moved along the tracks, said gauge having a passageway extending to the bottom of the recess for passage of the blade.

7. A workpiece conveying cart for masonry saws of a type including a frame having spaced tracks at sides of the frame for reciprocably supporting the cart under a rotary blade which is adapted to be lowered into contact under pressure with a workpiece adapted to be carried by the cart and raised from the workpiece by action of a spring, said cart including a body member having a substantially rectangular platen portion and flanges depending from the front, back and sides of the platen portion, wheels journaled on the side flanges and adapted to roll on the tracks, said platen portion having portions thereof spaced apart at a point in registry with the blade of the saw to provide a recess, wall portions depending from said spaced portions of the platen and providing closed sides for the recess and connected along lower edges by a web closing the bottom of said recess, said ends of the recess extending through the front and rear depending flanges, and a cushioning element in the recess and having side portions engaging the side walls of the recess and an under face engaging the web for supporting the upper face in registry with the upper face of the platen for cushioning the blade when the blade cuts through a workpiece, said web forming the bottom of the recess having a drain opening therethrough.

8. A workpiece conveying cart for masonry saws of a type including a frame having spaced tracks at sides of the frame for reciprocably supporting the cart under a rotary blade which is adapted to be lowered into contact under pressure and raised from the workpiece by spring action, said cart including a body member having a substantially rectangular platen portion and flanges depending from the front, back and sides of the platen portion, a board supported on the platen portion for seating the workpiece to be cut, wheels journaled on the side flanges and adapted to roll on the tracks, said platen portion having portions thereof spaced apart at a point in registry with the blade of the saw to provide a recess, wall portions depending from said spaced portions of the platen and providing closed sides for the recess and connected along lower edges by a web closing the bottom of said recess, said ends of the recess extending through the front and rear depending flanges, rims projecting upwardly from the platen portion along the front and sides thereof and cooperating with edge faces of the board and the upper face of the platen portion to provide gutters, a cushioning element in the recess and having side portions engaging the side walls of the recess and an under face engaging the web for supporting the upper face in registry with the upper face of the platen for cushioning the blade when the blade cuts through a workpiece, and said gutters having ports in the platen portion for draining water and sludge.

No references cited.